(12) United States Patent
Iryami et al.

(10) Patent No.: US 6,268,808 B1
(45) Date of Patent: Jul. 31, 2001

(54) HIGH SPEED DATA MODIFICATION SYSTEM AND METHOD

(75) Inventors: Farhad Iryami, Millbrae; Mark Farley, Napa, both of CA (US)

(73) Assignee: Finisar Corporation, Mountain View, CA (US)

( * ) Notice: Subject to any disclaimer, the term of this patent is extended or adjusted under 35 U.S.C. 154(b) by 0 days.

(21) Appl. No.: 09/327,997

(22) Filed: Jun. 8, 1999

(51) Int. Cl.[7] ................................................ H03M 7/00
(52) U.S. Cl. .............................................. 341/51; 370/389
(58) Field of Search ....................... 341/51, 56; 370/389, 370/528; 371/37

(56) References Cited

U.S. PATENT DOCUMENTS

| | | | |
|---|---|---|---|
| 4,999,837 | 3/1991 | Reynolds et al. | 371/3 |
| 5,001,712 | 3/1991 | Splett et al. | 371/3 |
| 5,008,885 | 4/1991 | Huang et al. | 371/3 |
| 5,276,690 | 1/1994 | Lee et al. | 371/3 |
| 5,983,275 | * 11/1999 | Ecclesine | 709/231 |
| 6,088,354 | * 7/2000 | Lenell | 370/389 |

* cited by examiner

*Primary Examiner*—Brian Young
(74) *Attorney, Agent, or Firm*—Pennie & Edmonds LLP

(57) ABSTRACT

A data modifier including a trigger subsystem and a modification subsystem. The trigger subsystem generates a trigger signal when it detects the presence of a user predefined pattern in an input data stream. The modification subsystem responds to the trigger signal by altering user specified portions of a first input datum of the input data stream to create a corresponding output datum having a fixed, real-time delay with respect to the first input datum.

13 Claims, 6 Drawing Sheets

HIGH SPEED DATA MODIFICATION SYSTEM AND METHOD

The present invention relates generally to high speed data communications, and particularly to a method and system for altering high speed fibre channel data in a user specified manner.

BACKGROUND OF THE INVENTION

FIG. 1 illustrates, in block diagram form, High Speed Data Channel System 30. High Speed Data Channel System 30 includes two Devices 32 and 34 that communicate via duplex High Speed Data Channel Path 36. High Speed Data Channel Path 36 consists of Data Path A 38 and Data Path B 40. Data Path A carries a digital traffic stream from Device 32 to Device 34, while Data Path B carries a digital traffic stream from Device 34 to Device 32.

Each traffic stream carries at least two types of digital data, each having its own format. (The term "datum" is used herein to refer to a single item of data, regardless of its type or format.) One data type is the link delimiter. A link delimiter is a set of bits, normally ranging from 8 to 32 bits, in multiples of 8, that are used for various synchronization purposes. Within the fibre channel protocol link delimiters are called ordered sets, of which there are several types, including, for example, OPN, CLS, RRDY and IDLE. Another data type is the frame. According to the frame format, a frame begins with a Start of Frame delimiter (SOF), followed by a header, payload, and Cyclical Redundancy Check (CRC), and ending with an End of Frame delimiter (EOF). There are several types of SOFs and EOFs, any one of which may be included in a frame. A frame header is a combination of a channel header, followed by other optional high level headers, and other, optional, application specific headers. Both the frame header and payload include a multiplicity of words. According to High Speed Data Channel conventions, a word includes 32 bits, which is equivalent to 40 bits of serial data transfer.

As high speed data communications mature, designs increasingly focus on reliability and performance issues. Thus, a need exists for means of altering channel data, including introducing errors into channel data paths, and for monitoring system response to the altered data. As used herein, "system" includes all the hardware and software sub-systems. Such a means of altering data would enable system designers to determine, for example:

1. whether a system responded appropriately to incomplete, misplaced or missing tasks or sequences;
2. how misdirected or confusing frames are treated; and
3. how misplaced ordered sets are treats.

Simulating these types of errors permits realistic modeling of complex link and subsystem errors.

SUMMARY OF THE INVENTION

The Data Modifier of the present invention enables testing of High Speed Channel Systems response to altered data. The Data Modifier modifies channel data in a user specified manner response to a user predefined trigger. Absent trigger detection, the Data Modifier operates in a pass-through mode, outputting unmodified traffic. Briefly described, the Data Modifier of the present invention includes a Trigger Subsystem and a Modification Subsystem. The Trigger Subsystem generates a trigger signal when it detects the presence of a user predefined pattern in a first input datum of an input data stream. The Modification Subsystem responds to the trigger signal by altering user specified portions of the first input datum of the input data stream to create a corresponding output datum having a fixed, real-time delay with respect to the first input datum.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
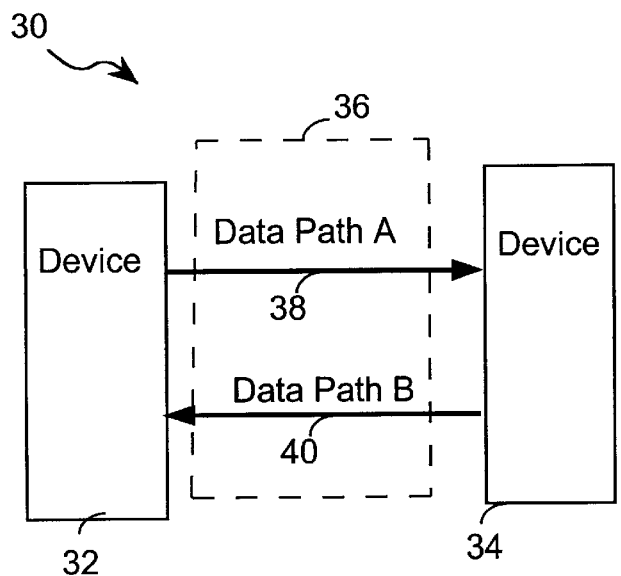
FIG. 1 is a block diagram of a prior art High Speed Channel Communications System.
Figure 2:
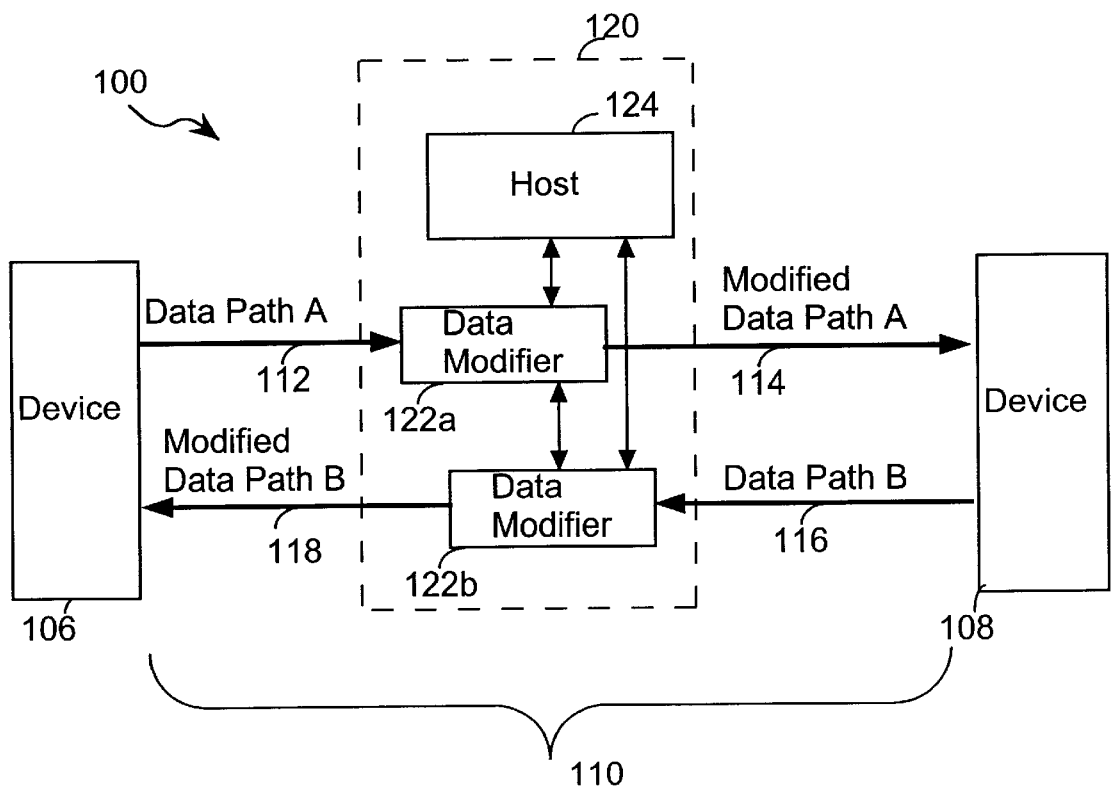
FIG. 2 is a block diagram of a High Speed Channel Communications System incorporating the Data Modifier of the present invention.

FIG. 2 illustrates, in block diagram form, High Speed Communications System 100, which includes two Devices 106 and 108 that communicate with one another via duplex High Speed Channel Path 110. Inserted into High Speed Channel Path 110, Data Modification System 120 enables testing of the response High Speed Communications System 100 to modified digital data. Data Modification System 120 includes two Data Modifiers 122a and 122b of the present invention. Briefly described, the Data Modifier 122 of the present invention includes a Trigger Subsystem and a Modification Subsystem. The Trigger Subsystem monitors a digital data path of the High Speed Channel Path waiting for a datum in the stream to match a predefined pattern specified by Host 124. The Trigger Subsystem generates a trigger signal when it detects an input datum matching the specified pattern. The Modification Subsystem responds to the trigger signal by jamming—altering selected portions of the input datum in a user specified manner in real time. Thus, the Modification Subsystem produces from the input datum a corresponding output datum having a fixed, real-time delay with respect to the input datum. The Data Modifier 122 of the present invention will be described in detail with respect to FIGS. 3–9.

A. Data Modification System Overview

Data Modification System 120 enables controlled and reproducible testing of the error recovery paths of High Speed Devices 106 and 108. Data Modification System 120 permits a user to Test System 100 reaction to a user specified error in response to user specified trigger conditions. By capturing the modified and unmodified traffic and the system response, Data Modification System 120 provides the user with a good understanding of how the error recovery paths of Devices 106 and 108 react individually and/or together.

Referring again to FIG. 2, Data Modification System 120 includes two Data Modifiers 122a and 122b and Host 124.

Host 124 functions as an input/output device for the user, receiving the user specified trigger conditions and jamming parameters and conveying them to the appropriate Data Modifier 122. Host 124 also conveys information relating to the state of Data Modifiers 122*a* and 122*b* to the user. Preferably, Host 124 is realized as a personal computer or workstation running a graphical user interface (GUI) to enable the user to easily specify trigger conditions and jamming events. Data Modifiers 122 recognize trigger conditions specified by Host 124 and modify triggering datums in a manner specified by Host 124 to produce jamm datums.

The Data Modifier 122 enables High Speed channel designers and system integrators to study numerous error recovery paths. This flexibility arises because Data Modifier 122 can trigger on and modify any type of datum, ordered set or frame, or even in response to an ARM signal. Still greater flexibility arises from the ability of the Data Modifier 122 to trigger on or modify any part of a frame, including the SOF, header, payload, CRC or EOF. With the present invention one ordered set may be replaced with another— such as replacing an OPN with an IDLE—enabling testers to determine whether the system responds appropriately to incomplete or misplaced datums. As part of a Data Modification System, Data Modifier 122 allows replacement of a D_ID to redirect a frame to test system response to misdirected and incomplete sequences. The Data Modifier 122 also allows modification of frame payload and/or CRC to test system response to a bad frame, truncation of frame payloads to determine whether a system checks data integrity, or modification of login frames to determine system response to an incomplete or invalid login.

Data Modification System 120 recognizes a number of trigger conditions. A user may define any type of ordered set as a trigger condition, a particular data pattern within a frame as a trigger condition, or receipt of an ArmRX signal. The specified triggering data pattern may occur within any user defined location within the frame, SOF, header, payload, CRC or EOF. Additionally, the Data Modifier 122 permits both single level triggering and two-level triggering. In other words, a user may specify a single condition that will trigger data modification or the user may specify two conditions, one which must occur after the other, that will trigger data modification. The user may also specify that one trigger condition must occur on one data path and the other trigger condition on the other path. For example, the user may specify that the first trigger condition is assertion of ArmRx while the second trigger condition is an OPN OS on the opposite data path. Data Modification System 120 also permits a user to specify which of the two data paths should be jammed in response to detection of the trigger condition (s). Stated another way, Data Modification System 120 supports both native and alien jamming. Native jamming is selected when a user specifies that the data path being monitored for the trigger conditions is the same data path to be jammed and alien jamming is selected when the user specifies that the data path being monitored for the trigger conditions is not the data path to be jammed. Thus, for example, native jamming is selected when Data Path B is both monitored for trigger conditions and jammed in response to the trigger. However, alien jamming is selected when Data Path B is monitored for the trigger conditions but Data Path A is jammed in response to the trigger.

In the absence of user specified trigger conditions, Data Modification System 120 operates in a pass-through mode, allowing traffic to pass through it unmodified.

B. Data Modifier Overview

Figure 3:
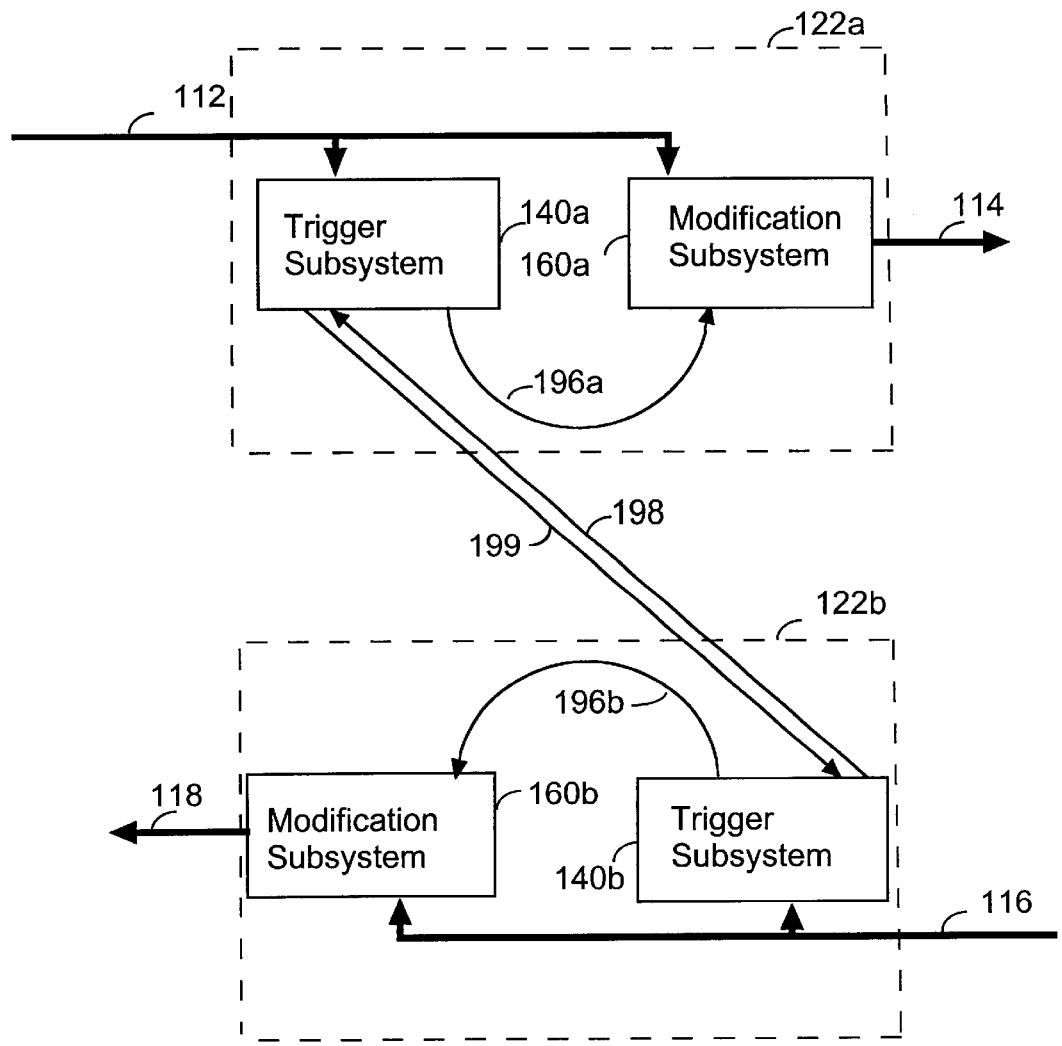
FIG. 3 is a block diagram of a Data Modification System incorporating two Data Modifiers of the present invention.

The block diagram of FIG. 3 illustrates Data Modifiers 122*a* and 122*b* and their relationship to one another. Each Data Modifier 122 divides a path of the duplex High Speed channel path into unmodified and modified, or jammed, portions. Data Modifier 122*a* divides one path into (unmodified) Data Path A 112 and modified Data Path A 114, while Data Modifier 122*b* divides the other path into (unmodified) Data Path B 116 and modified Data Path B 118. While Data Paths 114 and 118 are referred to herein as modified data paths, during pass through mode these data paths carry data that is unmodified, but delayed by a fixed length delay, as compared to their corresponding unjammed data paths. However, when a trigger condition is detected in a selected one of the two unmodified data paths, a Data Modifier alters the triggering item of data to produce an output datum that varies in a predefined manner from the triggering datum.

Each Data Modifier 122 includes a Trigger Subsystem 140, which receives unjammed data. The Triggering Subsystem 140 searches the unjammed data traffic for datums matching the trigger condition or conditions. Upon recognition of the trigger condition(s) Triggering Subsystem 140 generates one of two possible signals to initiate data modification based upon programming from Host 124. To initiate native jamming by its associated Modification Subsystem 160, Trigger Subsystem 140 enables data modification by bringing active EnJam Signal 196. On the other hand, if programmed for alien jamming, a Trigger Subsystem 140 generates an ARM Signal 198, which is coupled to another Trigger Subsystem 140. In response to receipt of an active ARM Signal 199, a Trigger Subsystem 140 brings its own EnJam Signal 196 active to trigger its associated Modification Subsystem 160.

Via Host 124, a user may program a Trigger Subsystem 140 to trigger in response to any one or two of a set of possible trigger conditions. The set of possible trigger conditions includes all types of frame delimiters and ordered sets, such as OPN, CLS, RRDY or IDLE, for example, as well as any data pattern within any location in a frame, SOF, header, payload, CRC or EOF. Trigger Subsystem 140 may be programmed for single-level or two-level triggering. Single-level triggering causes Trigger Subsystem 140 to trigger in response to the occurrence of a single trigger condition. In contrast, two-level triggering causes Trigger Subsystem 140 to trigger when a first trigger condition occurs within an arbitrary specified time period after the occurrence of a second trigger condition.

Figure 4:
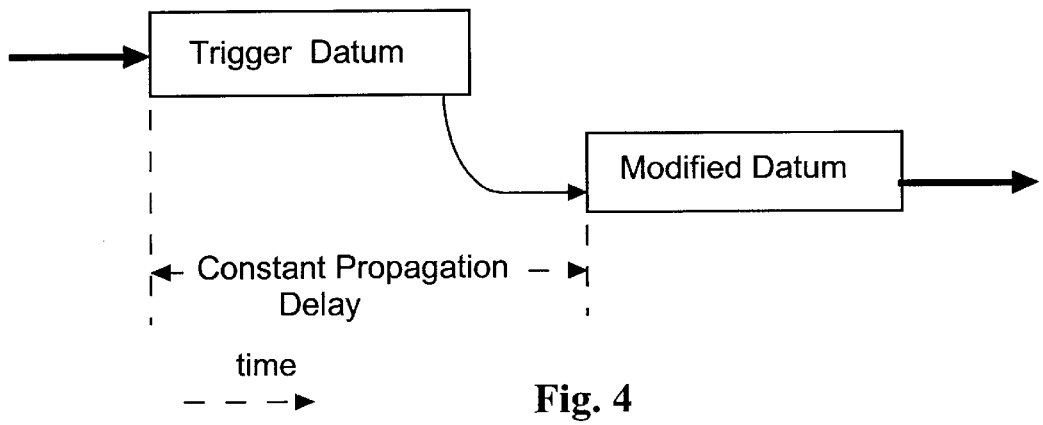
FIG. 4 is a timing diagram illustrating the propagation delay between a triggering datum input to a Data Modifier and a jammed datum output by the Data Modifier.

Modification Subsystem 160 also receives unjammed data, which it delays as compared to Trigger Subsystem 140, to allow jamming of the triggering datum. In response to a trigger signal Modification Subsystem 160 injects errors into the jammed data path by altering the triggering datum. Data modification effects only the triggering datum without altering the rest of the traffic in any other sense. In other words, the location of the jammed datum within the data stream is exactly that of triggering datum. As indicated in FIG. 4, Modification Subsystem 160 is able to jamm the triggering datum because it incorporates sufficient constant, real-time delay as compared to Trigger Subsystem 140. Consequently, the trigger signal not only identifies when jamming should occur, but also identifies the datum to be modified. Modification Subsystem 160 jamms the triggering data in a manner specified by the user via Host 124.

Modification Subsystem 160 may be programmed for OS jamming or frame jamming. During OS jamming the Modification Subsystem 160 replaces any OS with any other OS. Modification Subsystem 160 supports three types of frame modification. The first, vanish frame jamming, replaces the triggering frame with idles. The second, frame cut jamming, reduces the size of the triggering frame by removing from it specified words from the payload to produce the jamm frame. Given this modified payload, the Modification Subsystem 160 calculates new and valid CRC and EOF, which are inserted into the jamm frame. To maintain the relationship that existed between the triggering frame and its neighboring datums, as many idles as necessary are inserted into the output data stream following the jamm frame. The third type, bits/word jamming, allows modification of every word within a frame while maintaining the size and location of the frame within the data stream. Possible word modifications include modifying individual bits by clearing, setting or inverting them, the entire word may be replaced with a new word, or a mask may be applied. Additionally, during bit/word jamming the CRC and of a triggering frame may be replaced with valid ones, user specified ones, or the old ones may be used.

Figure 5:
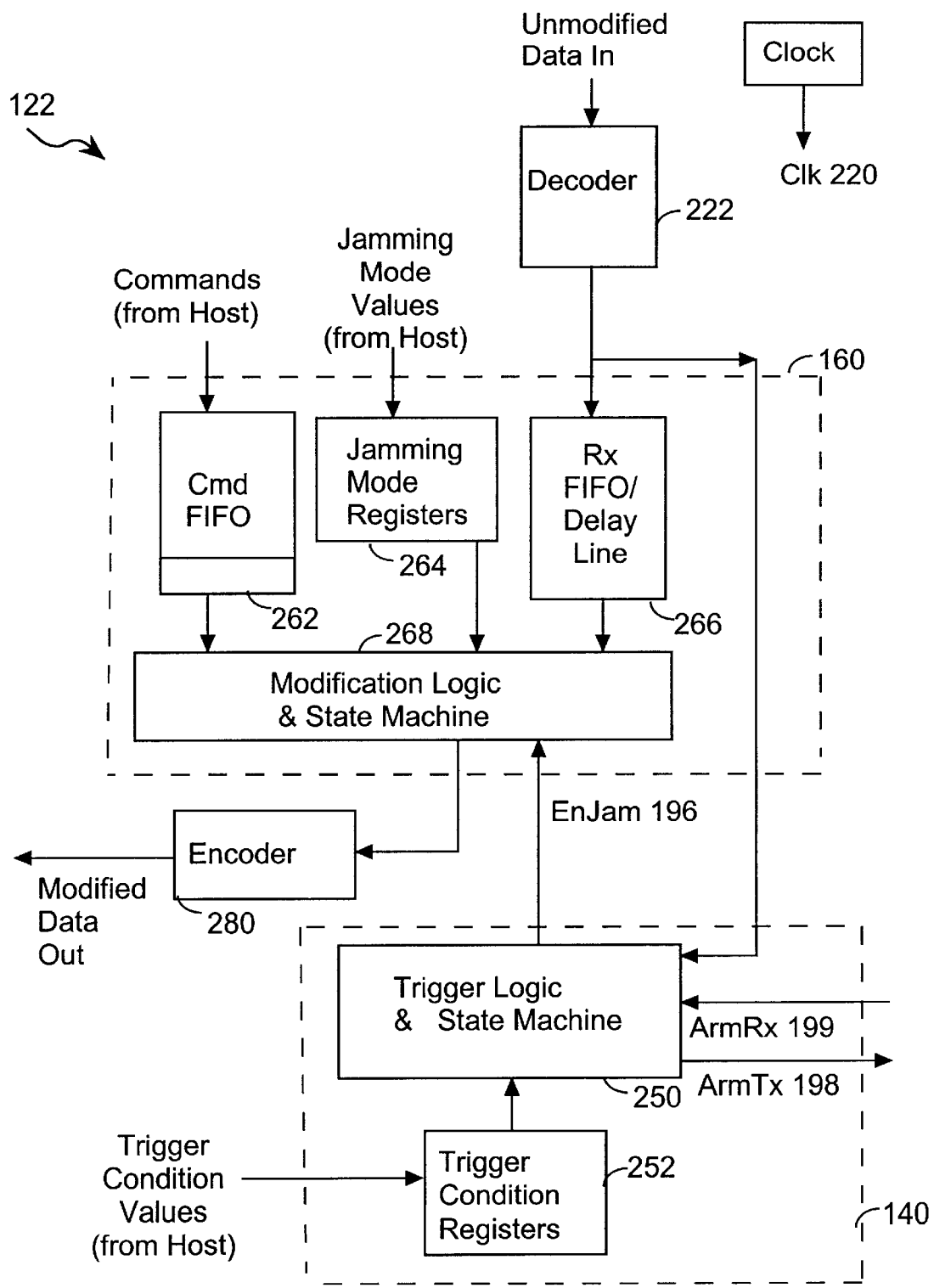
FIG. 5 is a block diagram of the Data Modifier illustrating the Trigger Subsystem and the Modification Subsystem.

FIG. 5 illustrates, in block diagram form, both Trigger Subsystem 140 and Modification Subsystem 160. Both Subsystems 140 and 160 operate synchronously with Clk 220. Both Subsystems 140 and 160 receive unjammed traffic from Decoder 222, which reformats 40 bit datums into 32 bit datums.

Trigger Subsystem 140 includes Trigger Logic and State Machine 250 and Trigger Condition Registers 252. Host 124 programs Trigger Condition Registers 252 in accordance with the user's testing plans as communicated by Host 124. Trigger Logic and State Machine 250 uses the information stored in the Trigger Condition Registers 252 to identify an unjammed datum that is to be altered. When such a datum is identified, Trigger Logic and State Machine 250 asserts one of its output signals, ArmTx 198 or EnJam 196. Alternatively, in response to ArmRX 199, Trigger Logic and State Machine 250 asserts EnJam 196.

Modification Subsystem 160 includes command FIFO 262, Jamming Mode Registers 264, Data FIFO/Delay Line 266 and Modification Logic and State Machine 268. Command FIFO 262 stores jamming commands from Host 124 pending their execution. Jamming Mode Registers 264 store values to be used in modifying datums according to the Host's 124 commands. For example, Command FIFO 262 and Jamming Mode Registers 264 may indicate that a replace OS jamm is to take place may indicate that an OS is to be replaced with an OPN. Data FIFO 266 receives and delays unjammed data to allow sufficient time after the receipt of EnJam 196 to enable Trigger Subsystem 140 to modify the triggering datum as indicated by the Jamming Mode Registers 264. While EnJam 196 remains inactive, data passes through Data FIFO 266 and Jamming Logic and State Machine 268 unaltered. Encoder 280 takes the 32 bit jammed data from Modification Subsystem 160 and converts to a 40 bit format for serial data transfer.

C. Trigger Subsystem

Figure 6:
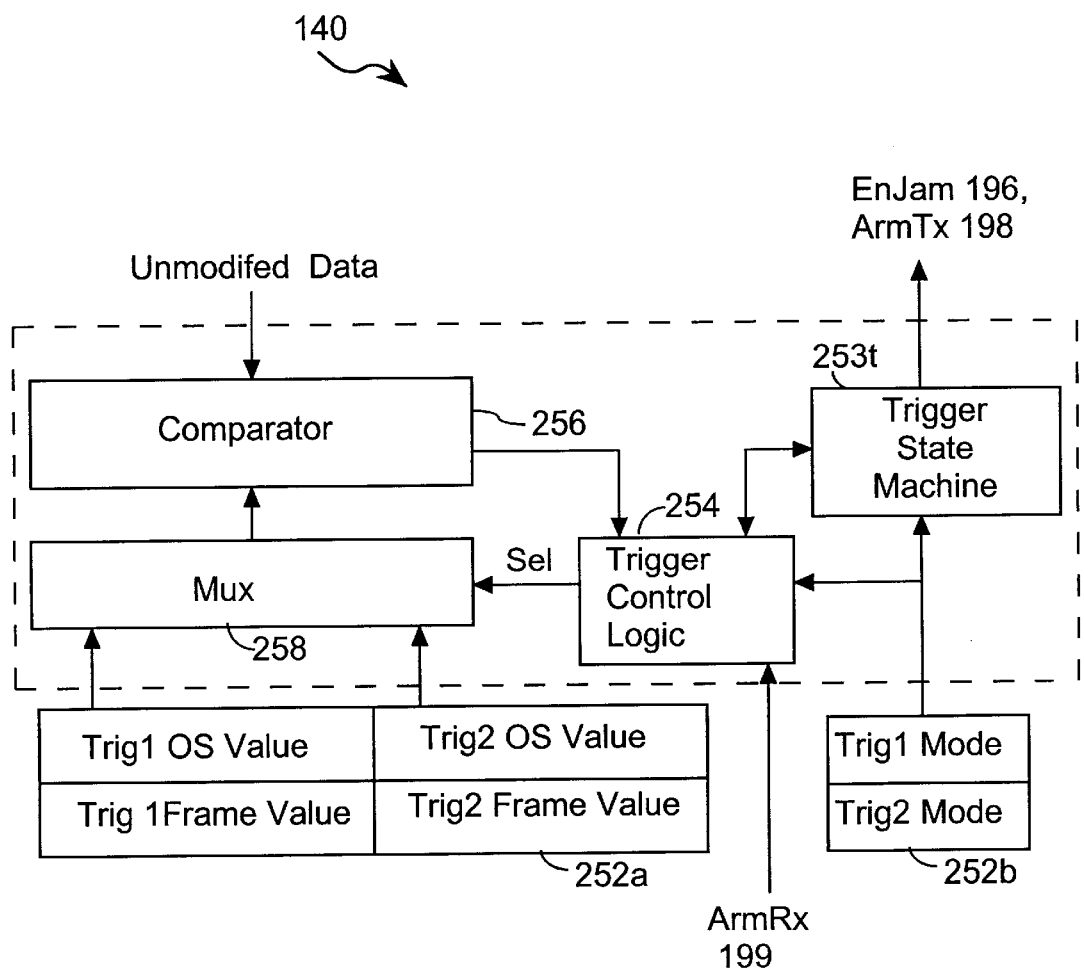
FIG. 6 is a block diagram of the Trigger Subsystem of the Data Modifier.

FIG. 6 illustrates Trigger Subsystem 140 in yet more detail. Trigger Condition Registers 252 include Registers 252a and 252b. Registers 252b indicate whether or not trigger levels 1 and 2 are enabled and the type of triggering selected for each trigger condition; i.e., assertion of ArmRx 199, OS or some type of frame. Registers 252b also indicate whether the Host 124 has selected native or alien jamming; i.e., whether EnJam 196 or ArmTx 198 should be asserted. Registers 252a indicate OS and Frame values to be used with the selected trigger type. For example, if OS triggering is enabled for level 1, then the Trig1 OS value may represent the OPN OS.

Trigger Logic and State Machine 250 includes Trigger State Machine 253, Trigger Control Logic 254, Comparator 256 and Mux 258. Trigger Control Logic 254 controls Mux 258 to determine which information from Registers 252a should be input to Comparator 256 for comparison with the incoming unjammed data. Trigger Control Logic 254 also interprets the output from Comparator 256 in light of the state of Trigger State Machine 252, the level and type of triggering indicated by Registers 252b and, if relevant to the triggering conditions, the state of ArmRx 199. Trigger Control Logic 254 indicates it's interpretation of the Comparator's output to Trigger State Machine 252 via a number of signals, which will be discussed below with respect to FIG. 7.

Figure 7:
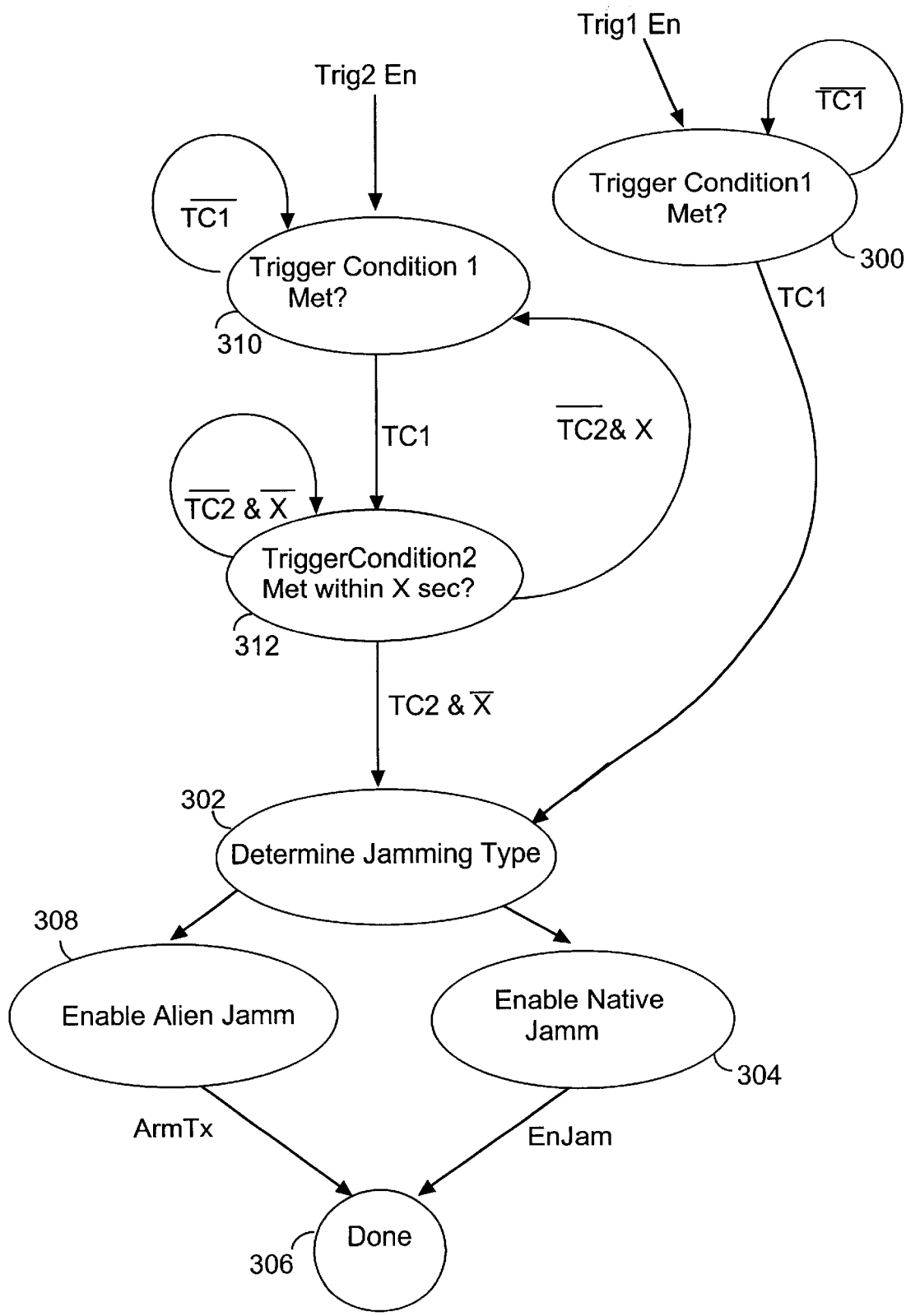
FIG. 7 is a state diagram for the Trigger State Machine of the Trigger Subsystem.

The state diagram of FIG. 7 illustrates the function of Trigger State Machine 252. When Registers 252 define a single level trigger condition, then Trigger State Machine 252 idles in state 300, waiting for Trigger Control Logic 254 to indicate that the specified trigger condition has been met by asserting a Signal TC1. In response to the assertion of TC1, Trigger State Machine 252 advances to State 302. In State 302, Trigger State Machine 262 consults Registers 252b to determine whether alien or native jamming is to be initiated. If native jamming is indicated, Trigger State Machine 252 advances to State 304 and asserts EnJam 196 to initiate native jamming. On the other hand, if Registers 252b indicate alien jamming, then Trigger State Machine 262 branches to State 308 from State 302. There Trigger State Machine 262 asserts ArmRx 198 to initiate alien jamming. From States 304 and 308, Trigger State Machine 262 advances to State 306.

In response to two level triggering, Trigger State Machine 252 begins in State 310. Once Trigger Control Logic 254 indicates that the first level trigger condition has been satisfied by asserting signal TC1, Trigger State Machine 252 advances to State 312 from State 310. In this state, Trigger State Machine 252 awaits satisfaction of the second level trigger condition, as indicated by the assertion of TC2, within X seconds of TC2. (The value of X is a design choice.) If the second level trigger condition is not satisfied within that time period, Trigger State Machine 252 returns to State 310. On the other hand, if Trigger Control Logic 250 asserts TC2 within X seconds, then Trigger State Machine 252 advances to State 302 from State 312. Execution of States 302, 304, 308 and 306 proceeds as described above.

D. Modification Logic & State Machine

Figure 8:
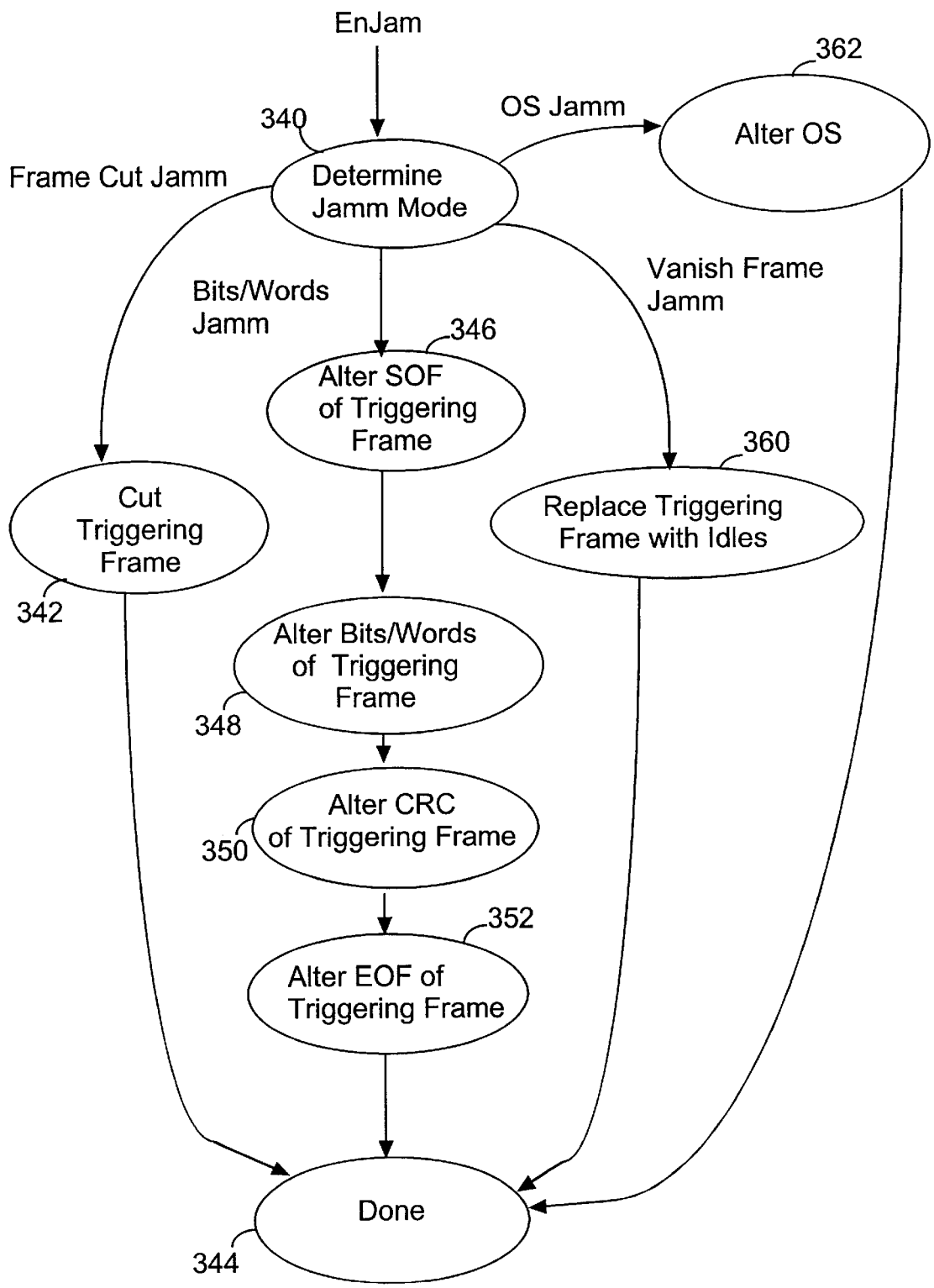
FIG. 8 is a state diagram for the Modification Logic & State Machine.

The state diagram of FIG. 8 illustrates the process by which Modification Logic & State Machine 268 alters an unjammed triggering frame to produce a corresponding jammed frame. The Modification Logic State Machine 268 responds to assertion of the signal EnJam 196 by advancing to State 340. In State 340 Modification Logic & State Machine 268 analyzes information stored in command FIFO 262 to determine the type of jamming that should occur; i.e., how the triggering frame should be altered.

If a frame cut jamm has been selected, the Modification Logic & State Machine 268 branches to State 342 from State 340. During State 340 the Modification Logic & State Machine 268 consults the Jamming Mode Registers 264 to determine which words of the triggering frame should be removed. After removing the specified words of the triggering frame, the Modification Logic & State Machine 268 calculates a valid CRC and EOF for the modified payload, and replaces the old CRC and EOF with these new values to produce the jamm frame. Further, the Modification Logic & State Machine 268 inserts N IDLE words after the EOF of the jamm frame, where N is the number of words removed from the triggering frame. That done, the Modification Logic & State Machine 268 advances to State 344.

If Jamming Mode Registers 264 indicate that a bits/words jamm has been selected, the Modification Logic & State Machine 268 branches from State 340 to State 346. Bits/words jamming enables alteration of every word within the triggering frame without altering its size or its location within the datum traffic. If the command FIFO indicates that the SOF of the triggering frame should be altered, then during Step 346 the Modification Logic & State Machine 268 consults command FIFO 262 to determine how the SOF should be altered and so alters the SOF. That done, Modification Logic & State Machine 268 advances to Step 348. During Step 348, the Modification Logic & State Machine 268 alters specified bits and/or words of the triggering frame in a manner specified by the jamming mode Registers 264, provided that command FIFO 262 has commanded such alteration. Afterward, the Modification Logic & State Machine 268 advances to State 350. During this state the CRC of the triggering frame is altered in a manner indicated by the Jamming Mode Registers 264.

In a preferred embodiment, when the bits/word jamm mode has been selected the host loads the command FIFO 262 with M command words, one for each of the first M words of the frame to be jammed. Each command word stored in the command FIFO 262 specifies a transformation to be applied to a respective word of the triggering frame to produce the jammed frame. Thus, a first command word indicates how the first word of the frame is to be transformed, a second command word indicates how the second word of the frame is to be transformed, and so on. Because each command word is a separate and distinct transformation command, the type of transformation applied to each word of the frame may be distinct. In the preferred embodiment, the types of transformations that can be specified by any particular command word include replace, mask, bit change and OS swapping. A replace transformation replaces a specified word of the triggering frame with a specified value, or, if the triggering datum is a CRC, replaces the CRC of the triggering datum with a CRC that is valid for the jamm frame. The mask transformation applies a user specified mask to a user specified word. The invert transformation inverts specified bits of a word using a user specified mask. The OS swap transformation replace an OS in the triggering datum with another OS in the jamm datum.

If the command FIFO 262 indicates that a vanish frame jamm has been selected, the Modification Logic & State Machine 268 branches from State 340 to State 360, where it replaces all words of the jamming frame with I DLE words (i.e., a predefined type of ordered set used to fill space between packets). When the entire triggering frame has been replaced by IDLE words, the Modification Logic & State Machine 268 advances to State 344.

Alternate Embodiments

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A data modifier for modifying a first input stream of datums to produce a first output stream of datums, each datum having one of a plurality of data formats, the plurality of data formats including a frame and a link delimiter, the data modifier comprising:

a first trigger subsystem for generating a trigger signal when a first input datum of the first input stream matches a first specified data pattern; and a modification subsystem responsive to the trigger signal, for altering specified portions of the first input datum so as to form a corresponding output datum having a fixed, real-time delay with respect to the first input datum.

2. The data modifier of claim 1, wherein the modification subsystem outputs as output datums unchanged input datums in the absence of trigger signal.

3. The data modifier of claim 1 further comprising:

a second trigger subsystem monitoring a second input stream of input datums and generating an arming signal when a second input datum in the second input stream matches a second specified data pattern; and wherein the first trigger subsystem generates the trigger signal in response to the arming signal.

4. The data modifier of claim 1, wherein the specified portions of the first input datum are specified by a sequence of commands, each command specifying a replacement word for a corresponding word in the first input datum.

5. The data modifier of claim 1, wherein the link delimiter format includes a group of link delimiter types; and wherein the first specified data pattern is a one of the group of link delimiter types.

6. The data modifier of claim 1, wherein prior to searching the first input stream for the first datum the first trigger subsystem searches the first input stream for a second input datum matching a second specified data pattern.

7. The data modifier of claim 1, wherein altering specified portions of the first input datum causes the corresponding output datum to be shorter than the first input datum.

8. The data modifier of claim 1, wherein the first input datum is a frame including at least a one of an Start of Frame delimiter (SOF) and an End of Frame delimiter (EOF) and wherein altering the first input datum produces an output datum lacking at least a selected one of the EOF and the SOF.

9. A method of modifying a first input stream of datums to produce a first output stream of datums, each datum of the first output stream corresponding to a one of the datums of the first input stream corresponding datum of the first input stream, each datums having a one of a plurality of data formats, the plurality of data formats including a frame and a link delimiter, the method comprising the steps of:

a) generating a trigger signal when a first input datum of the first input stream matches a first specified data pattern;

b) modifying the first output stream in response to the trigger signal by altering specified portions of the first input datum so as to form a first output datum corresponding to the first input datum, the first output datum having a fixed, real-time delay with respect to the first input datum.

10. The method of claim 9 further comprising the steps of:

c) generating an arming signal when a second input datum in a second input stream of datums matches a second specified data pattern; and d) generating the trigger signal in response to the arming signal.

11. The method of claim 9, wherein the first input datum includes a first Cylical Redundancy Check (CRC); and wherein step b) further comprises:

(1) calculating a second CRC for the first output datum after altering the specified portions of the first input datum; and (2) replacing in the first output datum the first CRC with the second CRC.

12. The method of claim 9, wherein the specified portion of the input datum is a first word; and wherein step b) includes replacing the first word with a second word in the first output datum.

13. The method of claim 9, wherein step b) comprises:

(1) identifying a first word in the first input datum;

(2) applying a mask to the first word to generate a second word; and (3) replacing in the first output datum the first word with the second word.

* * * * *